(12) United States Patent
Coupvent Des Graviers

(10) Patent No.: US 8,935,659 B2
(45) Date of Patent: Jan. 13, 2015

(54) METHOD FOR GENERATING SOFTWARE

(75) Inventor: Marc-Emmanuel Coupvent Des Graviers, Clichy (FR)

(73) Assignee: Myriad France, Le Bourget-du-Lac (FR)

( * ) Notice: Subject to any disclaimer, the term of this patent is extended or adjusted under 35 U.S.C. 154(b) by 268 days.

(21) Appl. No.: 13/485,597

(22) Filed: May 31, 2012

(65) Prior Publication Data

US 2012/0311530 A1     Dec. 6, 2012

(30) Foreign Application Priority Data

May 31, 2011    (FR) ..................... 11 54772

(51) Int. Cl.
*G06F 9/44*       (2006.01)
*G06F 11/14*      (2006.01)
*G06F 9/45*       (2006.01)
*G06F 9/445*      (2006.01)

(52) U.S. Cl.
CPC ............ *G06F 11/1438* (2013.01); *G06F 8/447* (2013.01); *G06F 8/54* (2013.01); *G06F 11/1479* (2013.01)
USPC ........................................................ 717/107

(58) Field of Classification Search
USPC ........................................................ 717/107
See application file for complete search history.

(56) References Cited

U.S. PATENT DOCUMENTS

2006/0074931 A1    4/2006  Burka et al.
2010/0229163 A1*   9/2010  Rolland ........................ 717/159
2011/0107149 A1*   5/2011  Alexander et al. .............. 714/37
2013/0198713 A1*   8/2013  Zhang et al. .................. 717/106

FOREIGN PATENT DOCUMENTS

DE         102006039418 A1    2/2008

OTHER PUBLICATIONS

French Search Report and Written Opinion dated Dec. 27, 2011, French Patent Application No. 1154772.
Metrowerks Corporation, Freescale Semiconductor company: "CodeWarrior Development Studio for ColdFire Architectures v6.0, Targeting Manual" User Guide, Jun. 30, 2005, pp. 1-10, 67-71, 77-104, XP002665144, extract from Internet on Dec. 5, 2011: URL:http://cache.freescale.com/files/soft_dev_tools/doc/user_guide/COLDFIREUG.pdf.

* cited by examiner

*Primary Examiner* — John Chavis
(74) *Attorney, Agent, or Firm* — Patterson & Sheridan, LLP

(57) ABSTRACT

The method according to the invention for generating software, from source files associated with components, including first variables initialized at zero and second variables initialized at specific values, capable of being run on a terminal, includes, for each software component, at least one of which is capable of a specific restart when the software is run, a compilation step and a linkage editing step. It comprises, for at least one restartable software component, a step for renaming a data storage, data and data initialization segment, associated with each object file of the component to be restarted, and configuring the linkage editor, performing specific linkage editing suitable for repositioning the values of the second initialized variables of the renamed segment at specific values resulting from the renamed segment, and values of the first variables of the renamed segment, when the component is restarted.

8 Claims, 2 Drawing Sheets

METHOD FOR GENERATING SOFTWARE

CROSS-REFERENCE TO RELATED APPLICATIONS

This application claims benefit of French patent application number 1154772, filed May 31, 2011, which is herein incorporated by reference.

BACKGROUND OF THE INVENTION

1. Field of the Invention

The present invention relates to a method for generating software, comprising at least two software components, from source files associated with the software components, the source files including variables initialized at zero and variables initialized at specific values, capable of being run on a terminal including an operating system without virtual memory and a physical memory, the physical memory including random access memory, capable of containing at least one data storage segment and at least one data segment, and read-only memory, capable of containing at least one data initialization segment, the method including, for each software component, at least one of which is capable of a specific restart when the software is run, the following steps:

a compilation step, using a compiler capable of allocating, for each source file, the variables initialized at zero to a data storage segment, the initialized variables to a data segment, and the specific values of the initialized variables to a data initialization segment, and of converting the source files into object files, and a linkage editing step, using a linkage editor capable of grouping together the variables initialized at zero, the initialized variables, and their specific values in a respective block within their allocated respective segment, capable of assigning a predetermined zone of the memory for each block and capable of grouping together the object files to form an executable file corresponding to the software.

2. Description of the Related Art

The operating systems used in mobile terminals, for example such as mobile telephones, that include a physical memory are classified in two categories. The first category, corresponding to simple operating systems, is generally designated "RTOS" (Real Time Operating System), while the second category, corresponding to complete operating systems, is generally designated "complete OS."

One difference between these two categories lies in the fact that the complete operating systems have a virtual memory, unlike the simple operating systems. This virtual memory makes it possible to isolate software components, used by a given application, and to initialize the memory used by the software components each time the application is (re)started.

Software including several software components is integrated into the terminal owing to the use of the physical memory of the terminal. Traditionally, the physical memory includes a random access memory (RAM), which can contain a data storage segment (BSS) and a data segment (data), and a read-only memory (ROM), which can contain at least one data initialization segment.

In particular, the integration includes a software generation phase, from source files, associated with the software components, comprising variables initialized at specific values and variables initialized at zero, the software being able to be run by the terminal. The variables initialized at specific values correspond to variables used by a developer of the concerned software component and the content of which has been set at a specific value during development. The variables initialized at zero correspond to variables whereof the content has not been set by the developer. For these variables, it is the operating system that sets their content at zero.

In a known manner, the generation phase uses a generation method including a compilation step of the software, capable of allocating, for each software component, the variables initialized at zero in the data storage segment and the variables initialized at specific values in the data segment. This compilation step is also capable of converting the source files into object files.

The generation method also includes a linkage editing step, able to group together the variables initialized at zero and those initialized at specific values within their respective allocated segment, and to group the object files together so as to form an executable file corresponding to the software.

After the method has been applied, the data storage segment includes all of the variables initialized at zero associated with each component grouped together and the data segment includes the set of variables initialized at specific values associated with each component grouped together.

Thus, for a given software component, the variables initialized at zero and those initialized at specific values respectively occupy part of the data storage segment and part of the data segment.

During operation of the terminal, the latter can run applications using one or more software components.

In the event an application is restarted, it is necessary to restart the software component(s) used by the application.

However, for simple operating systems, i.e. for operating systems without virtual memory, the restart is done by reinitializing the data storage segment and the data segment.

The problem is that this restart causes all of the software components in memory in the terminal to restart, causing the terminal to restart during a particular period, and therefore making the terminal completely unavailable during that entire period.

SUMMARY OF THE INVENTION

The aim of the invention is therefore to propose a method for generating software allowing a specific restart of a software component so as to avoid a general restart of the terminal during the operation thereof.

To that end, the invention relates to a method for generating software of the aforementioned type, characterized in that it also comprises, for at least one software component suitable for a restart:

a step for renaming the data storage segment, the data segment, and the data initialization segment, associated with each object file of the software component to be restarted, and a step for configuring the linkage editor, intended to perform a specific linkage editing step suitable for repositioning values of the initialized variables of the renamed data segment at the specific values resulting from the renamed data initialization segment, and values of the variables initialized at zero of the renamed data storage segment, when the software component is restarted.

According to other embodiments, the generation method includes one or more of the following features, considered alone or according to all technically possible combinations:

the variables initialized at zero are variables that have a value set by the operating system, and the variables initialized at specific values are variables whereof the specific values have been set beforehand by a developer;

the specific linkage editing step includes the following steps:

a step for assigning a specific zone of the memory, different from the predetermined zone, for the renamed data storage segment, the renamed storage segment and the renamed data initialization segment, and a step for creating references at the beginning and end of each renamed segment, intended to indicate the location in the memory of the variables to be initialized when the software component suitable for a restart is restarted;

the software component is a software library;
the compiler is of the C/C++ type;
the terminal is a mobile telephone.

The invention also relates to a terminal able to run software, characterized in that the software is generated using the method as defined above.

The invention also relates to a computer program product comprising instructions which, when implemented by a central processing unit integrated into a terminal, implements the method as defined above.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
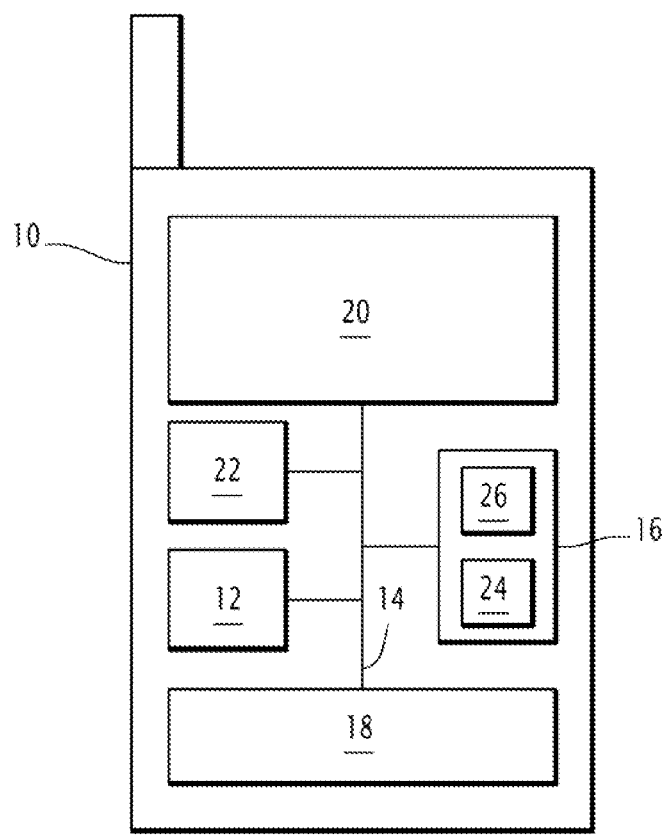
FIG. 1 is a diagrammatic illustration of a terminal including software generated using the method according to the invention.

FIG. 1 shows a terminal 10, for example such as a mobile telephone, that can interact with a mobile telephone network so as to establish communication with a remote user or terminal.

More specifically, the terminal 10 includes different electronic components necessary for its operation, for example such as a central processing unit 12, connected to a data bus 14, making it possible to exchange information with all of the other components of the terminal 10, such as one or more memories 16, a user interface 18, and a display screen 20.

The terminal 10 also includes communication means 22 allowing the exchange of data with the mobile telephony network.

The memory 16 includes software 24, comprising software components or applications, and an operating system 26, in the case at hand, without a mechanism using a virtual memory, which can be run by the central processing unit 12.

The central unit 12 can run the applications contained in memory 16, using the operating system 26, thereby allowing the traditional operation of a terminal 10.

The user interface 18 allows a user to interact with the terminal 10 and, more particularly, with the various applications that are run on the terminal 10, such as for example with a software component when it is run by the central unit 12. For example, in the case of a web browser, the software component is "Webkit."

The display screen 20 can allow the user to visualize different information from the applications run by the central unit 12.

Figure 2:
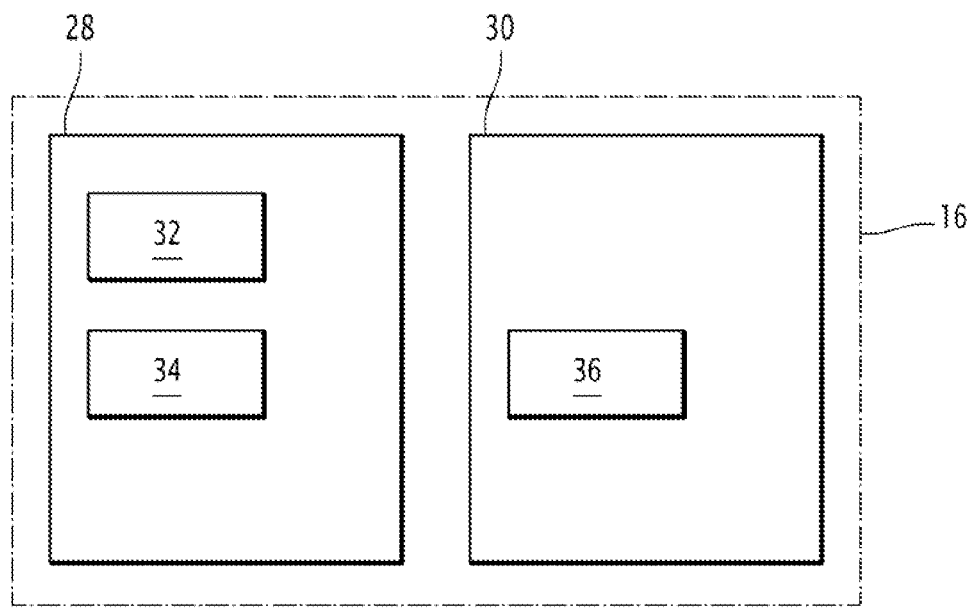
FIG. 2 is a diagrammatic illustration of a memory of a terminal.

The structure of the memory 16 will now be described more precisely using FIG. 2.

The memory 16 includes different memory zones, allocated statically or dynamically, as a function of the global software 24 and the applications run on the terminal 10.

More specifically, the memory 16 includes a random access memory 28 and a read-only memory 30.

The random access memory 28 and the read-only memory 30 are broken down into memory zones.

The random access memory 28 includes a data storage segment 32, more commonly called "BSS," intended to store variables initialized at zero. The random access memory 28 also includes a data segment 34, more commonly called "Data," intended to store variables initialized at specific values.

The read-only memory 30 includes a data initialization segment 36, more commonly called "Data_init," intended to store specific values of the variables initialized at specific values.

The method for generating the software 24 will now be described in light of FIG. 3.

The software 24 includes two different categories of software components 38, 42. One software component 38, from a first category, represented by a set of associated source files 40, corresponds to a software component that does not require a specific restart during the operation of the terminal 10. On the contrary, a software component 42, from a second category, represented by a set of associated source files 44, corresponds to a software component that requires a specific restart during the operation of the terminal 10.

Each source file 40, 44, respectively, includes code in a high-level language, for example in C, and variables, some variables being initialized at zero and others being initialized at specific values.

For the two categories of software components 38, 42, respectively, a compilation step 46 can respectively convert each source file 40, 44, respectively, into an object file 48, 50, respectively.

More specifically, traditionally, a compiler can allocate, for each source file 40, 44, respectively, the code 52, 54, respectively, to a code segment (not shown), the variables initialized at zero 56, 58, respectively, to the data storage segment 32, the variables initialized at specific values 60, 62, respectively, to the data segment 34, and the specific values 64, 66, respectively, of the initialized variables to the data initialization segment 36.

Then, a linkage editing step 68 can group together all of the object files 48, 50, respectively, in an executable file, corresponding to the software 24, to be loaded in memory 16 and run on the terminal 10.

More specifically, in a known manner, for the software component 38, a linkage editor groups together all of the variables initialized at zero 56 in a block 70 within the data storage segment 32, all of the variables initialized at specific values 60 in a block 72 within the data segment 34, and all of the specific values 64 in a block 74 within the data initialization segment 36.

Then, the linkage editor assigns a predetermined zone of the memory 16, by default, to each block 70, 72, 74, respectively.

More specifically, a predetermined zone 76 is assigned within the data storage segment 32 of the random access memory 28 for the block 70 grouping together all of the variables initialized at zero 56 of the component 38. Likewise, a predetermined zone 78 is assigned within the data segment 34 of the random access memory 28 for the block 72 grouping together all of the variables initialized at specific values 60 of the component 38.

Lastly, a predetermined zone 80 is assigned within the data initialization segment 36 of the read-only memory 30 for the block 74 grouping together all of the specific values 64 of the initialized variables of the component 38.

Figure 3:
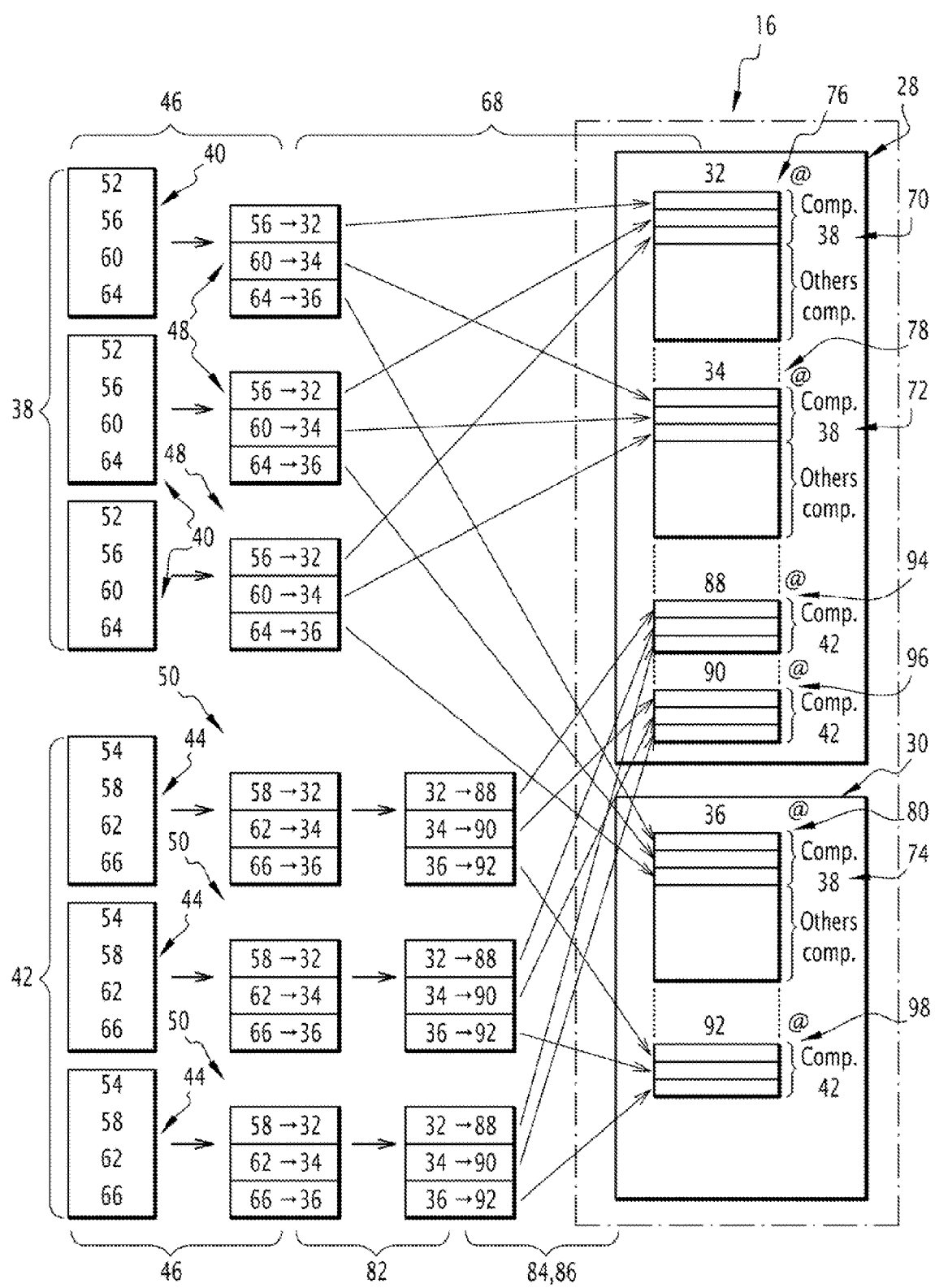
FIG. 3 is a flowchart of the method for generating software according to the invention.

Likewise, in the event the software 24 includes other software components of type 38, i.e. the first category not requiring a specific restart, the compilation 46 and linkage editing 68 steps make it possible to obtain, grouped together, a set of variables of type 56, 60 and of specific values of type 64 associated with the software components of type 38 within a same segment 32, 34, 36, respectively, as shown in FIG. 3. Thus, since the operating system 36 manages any restart of a software component of type 38 at its associated segments 32, 34, 36, respectively, in the event the software component 38 or any one of the other software components of type 38 are restarted, all of the software components are affected and will restart.

In a renaming step 82, regarding the component 42 after the compilation step 46, each segment respectively allocated to the variables initialized at zero 58, the variables initialized at specific values 62, and the specific values 66 is renamed.

More specifically, the set of object files 50 is edited so as to modify the name of the data storage segment 32 allocated to the variables initialized at zero 58. For example, the name "BSS" of the initial data segment 58 is renamed "BSS_Comp._42". According to the same principle, the names of the data segment 34 allocated to the variables initialized at specific values 60 and the data initialization segment 36 allocated to the specific values 64 are renamed.

Thus, this renaming step 82 can isolate the variables 58, 62 and the specific values 66 in specific segments that are specific to the software component 42, so as to allow a specific restart of the software component 42.

Following the renaming step 82, a step 84 for configuring the linkage editor is initiated so as to modify the default behavior of the linkage editor and perform a specific linkage editing step 86 for the software component 42.

The configuration of the linkage editor consists of indicating to it that the renamed data storage, data, and data initialization segments for all of the object files 50 resulting from the compilation of the sources files 44 must be allocated in specific zones of the software component 42, named according to the software component 42, respectively in random access memory 28 for the renamed data storage and data segments and in read-only memory 30 for the renamed data initialization segments, continuously using the linkage editing guidelines provided to that end.

Thus, during the specific linkage editing step 86, the linkage editor contiguously groups together all of the variables initialized at zero 58 in a renamed data storage segment 88.

According to the same principle, the set of variables initialized at specific values 62 is grouped together contiguously in a renamed data segment 90 and the set of specific values 66 is grouped together contiguously in a renamed data initialization segment 92.

Then, the linkage editor assigns a specific zone of the memory 16, different from the predetermined zone that is assigned to the component 38 in the considered example, for each renamed segment 88, 90, 92.

More specifically, a specific zone 94 is assigned for the renamed data storage segment 88 grouping together all of the variables initialized at zero 58 of the component 42. According to the same principle, a specific zone 96 is assigned for the renamed segment of the data segment 90 grouping together the set of variables initialized at specific values 62 of the component 42, and a specific zone 98 is assigned for the renamed data initialization segment 92 grouping together the set of specific values 66 of the initialized variables of the component 42.

Likewise, in the event the software 24 includes other software components of type 42, i.e. from the second category requiring a specific restart, the compilation 46, linkage editing 82, and configuration 84 steps make it possible to obtain a set of variables of type 58, 62 and specific values of type 66 associated with the software components of type 42 within renamed segments 88, 90, 92, respectively, these segments being associated only with their respective software components.

Lastly, the specific linkage editing step 86 includes a step for creating references at the beginning and end of each renamed segment 88, 90, 92. This step is intended to indicate, to initialization software of the equipment, the location in the memory 16 of the variables 58, 62 to be initialized when the software component 42 is restarted during the operation of the terminal.

During this reference creation step, the linkage editor creates variables with a specific name at the beginning and end of each renamed segment 88, 90, 92 at a given address of the memory 16, thereby making it possible to create references, or markers, for all of the renamed segments 88, 90, 92.

Thus, during operation of the terminal 10, in the event of operating errors associated with a software component 42, for example due to a memory overflow problem, the initialization software of the material recovers the addresses of the references for each renamed segment.

Next, the initialization software of the equipment initializes the set of data of the renamed data storage segment 88 at zero. Then, the software manages the repositioning, or copying, of the data of the renamed data initialization segment 92 in the renamed data segment 90.

Thus, since the set of variables 58, 62 associated with the software component 42 has been reinitialized, the software component 42 is suitable for a specific restart. As a result, owing to the inventive method, which makes it possible to isolate the segments associated with the variables used by one particular software component, the software component 42 is suitable for a restart independent of the other software components 38 and the software 24.

As a result, the method according to the invention makes it possible to avoid completely restarting terminals having simple operating systems without virtual memory in the event one or more specific software components need to be restarted. Consequently, the impact of restarting a software component on the availability of the services offered by the terminal is lessened considerably.

Here it has been considered that the operating system did not use virtual memory ("simple" operating system). Of course, the invention may be used with a "complete" operating system.

While the foregoing is directed to embodiments of the present invention, other and further embodiments of the invention may be devised without departing from the basic scope thereof, and the scope thereof is determined by the claims that follow.

The invention claimed is:

1. A method for generating software, comprising at least two software components, from source files associated with the software components, the source files including:
variables initialized at zero, and
variables initialized at specific values, capable of being run on a terminal including:

a physical memory, and
an operating system without virtual memory, wherein the physical memory includes:
   random access memory capable of containing at least one data storage segment and at least one data segment, and
   read-only memory capable of containing at least one data initialization segment,
the method including, for each software component, at least one of which is capable of a specific restart when the software is run, the following steps:
a compilation step, using a compiler capable of allocating, for each source file, the variables initialized at zero to a data storage segment, the initialized variables to a data segment, and the specific values of the initialized variables to a data initialization segment, and of converting the source files into object files, and
a linkage editing step, using a linkage editor capable of grouping together the variables initialized at zero, the initialized variables, and their specific values in a respective block within their allocated respective segment, capable of assigning a predetermined zone of the memory for each block and capable of grouping together the object files to form an executable file corresponding to the software,
wherein the method also comprises, for at least one software component suitable for a restart:
a step of renaming the data storage segment, the data segment, and the data initialization segment, associated with each object file of the software component to be restarted, and
a step of configuring the linkage editor, intended to perform a specific linkage editing step suitable for repositioning values of the initialized variables of the renamed data segment at the specific values resulting from the renamed data initialization segment, and values of the variables initialized at zero of the renamed data storage segment, when the software component is restarted.

2. The method according to claim 1, wherein the variables initialized at zero are variables that have a value set by the operating system, and in that the variables initialized at specific values are variables whereof the specific values have been set beforehand by a developer.

3. The method according to claim 1, wherein the specific linkage editing step includes the following steps:
   a step of assigning a specific zone of the memory, different from the predetermined zone, for the renamed data storage segment, the renamed storage segment and the renamed data initialization segment, and
   a step of creating references at the beginning and end of each renamed segment intended to indicate the location in the memory of the variables to be initialized when the software component suitable for a restart is restarted.

4. The method according to claim 1, wherein the software component is a software library.

5. The method according to claim 1, wherein the compiler is of the C/C++ type.

6. The method according to claim 1, wherein the terminal is a mobile telephone.

7. A terminal able to run software, wherein the software is generated using a method for generating software comprising at least two software components from source files associated with the software components, the source files including:
   variables initialized at zero, and
   variables initialized at specific values, capable of being run on a terminal including:
   a physical memory, and
   an operating system without virtual memory, wherein the physical memory includes:
      random access memory capable of containing at least one data storage segment and at least one data segment, and
      read-only memory capable of containing at least one data initialization segment,
   the method including, for each software component, at least one of which is capable of a specific restart when the software is run, the following steps:
   a compilation step, using a compiler capable of allocating, for each source file, the variables initialized at zero to a data storage segment, the initialized variables to a data segment, and the specific values of the initialized variables to a data initialization segment, and of converting the source files into object files, and
   a linkage editing step, using a linkage editor capable of grouping together the variables initialized at zero, the initialized variables, and their specific values in a respective block within their allocated respective segment, capable of assigning a predetermined zone of the memory for each block, and capable of grouping together the object files to form an executable file corresponding to the software,
   the method also comprising, for at least one software component suitable for a restart:
   a step of renaming the data storage segment, the data segment, and the data initialization segment, associated with each object file of the software component to be restarted, and
   a step of configuring the linkage editor, intended to perform a specific linkage editing step suitable for repositioning values of the initialized variables of the renamed data segment at the specific values resulting from the renamed data initialization segment, and values of the variables initialized at zero of the renamed data storage segment, when the software component is restarted.

8. A computer program product comprising instructions which, when implemented by a central processing unit integrated into a terminal, implements a method for generating software, comprising at least two software components, from source files associated with the software components, the source files including:
   variables initialized at zero, and
   variables initialized at specific values, capable of being run on a terminal including:
   a physical memory, and
   an operating system without virtual memory, wherein the physical memory includes:
      random access memory capable of containing at least one data storage segment and at least one data segment, and
      read-only memory capable of containing at least one data initialization segment,
   the method including, for each software component, at least one of which is capable of a specific restart when the software is run, the following steps:
   a compilation step, using a compiler capable of allocating, for each source file, the variables initialized at zero to a data storage segment, the initialized variables to a data segment, and the specific values of the initialized variables to a data initialization segment, and of converting the source files into object files, and
   a linkage editing step, using a linkage editor capable of grouping together the variables initialized at zero, the initialized variables, and their specific values in a respective block within their allocated respective segment, capable of assigning a predetermined zone of the memory for each block and capable of grouping together the object files to form an executable file corresponding to the software, the method also comprising, for at least one software component suitable for a restart:

a step of renaming the data storage segment, the data segment, and the data initialization segment, associated with each object file of the software component to be restarted, and a step of configuring the linkage editor, intended to perform a specific linkage editing step suitable for repositioning values of the initialized variables of the renamed data segment at the specific values resulting from the renamed data initialization segment, and values of the variables initialized at zero of the renamed data storage segment, when the software component is restarted.

* * * * *